(12) United States Patent
Girardin

(10) Patent No.: US 9,642,496 B2
(45) Date of Patent: May 9, 2017

(54) COLANDER

(71) Applicant: Christine Girardin, Las Vegas, NV (US)

(72) Inventor: Christine Girardin, Las Vegas, NV (US)

( * ) Notice: Subject to any disclaimer, the term of this patent is extended or adjusted under 35 U.S.C. 154(b) by 0 days.

(21) Appl. No.: 14/798,936

(22) Filed: Jul. 14, 2015

(65) Prior Publication Data

US 2016/0007803 A1 Jan. 14, 2016

Related U.S. Application Data

(60) Provisional application No. 62/024,170, filed on Jul. 14, 2014.

(51) Int. Cl.
| | |
|---|---|
| A47J 43/24 | (2006.01) |
| A47J 37/12 | (2006.01) |
| B01D 11/04 | (2006.01) |
| B65D 17/00 | (2006.01) |
| A47J 36/06 | (2006.01) |

(52) U.S. Cl.
CPC ........... *A47J 43/24* (2013.01); *A47J 37/1295* (2013.01); *B65D 17/165* (2013.01); *A47J 36/06* (2013.01); *B01D 11/043* (2013.01); *B01D 11/0426* (2013.01)

(58) Field of Classification Search
CPC ........ A47J 43/24; A47J 37/1295; A47J 36/06; B65D 17/165; B01D 11/0426; B01D 11/043; B01D 11/0434; B01D 11/0438
See application file for complete search history.

(56) References Cited

U.S. PATENT DOCUMENTS

| | | | | |
|---|---|---|---|---|
| 923,895 | A * | 6/1909 | Ryburg et al. ....... | B65D 47/265 220/821 |
| 1,193,954 | A * | 8/1916 | Walden ................. | B01F 13/002 220/253 |
| 1,471,361 | A * | 10/1923 | Sarles ..................... | A47J 43/22 209/283 |
| 1,896,976 | A * | 2/1933 | Schifferdecker ......... | G07D 9/02 15/185 |
| 1,970,451 | A * | 8/1934 | Gottlieb ............... | B65D 47/265 141/321 |
| 2,037,116 | A * | 4/1936 | Burdick ............... | B65D 47/265 222/555 |
| 2,138,967 | A * | 12/1938 | Harris ..................... | A47J 36/22 126/18 |

(Continued)

FOREIGN PATENT DOCUMENTS

| | | | | |
|---|---|---|---|---|
| DE | 3300048 | | 7/1984 | |
| FR | 2694488 | A1 * | 2/1994 | ............. A47J 43/22 |

*Primary Examiner* — Krishnan S Menon
*Assistant Examiner* — Waqaas Ali
(74) *Attorney, Agent, or Firm* — Global Intellectual Property Agency, LLC; Daniel Boudwin

(57) ABSTRACT

A colander for selectively opening and closing a bottom frame is provided. The colander includes an outer shell having a screen with an upper rim forming an open top, and a bottom frame. A circular inner screen is disposed on the bottom frame, wherein the inner screen is rotatable via a pivot pin. The colander further includes an annular base rotatably coupled to the bottom frame to provide an open and closed configuration for the inner screen. The colander bottom frame can be opened and closed to remove food and the like therefrom.

6 Claims, 3 Drawing Sheets

(56) References Cited

U.S. PATENT DOCUMENTS

| | | | | |
|---|---|---|---|---|
| 2,340,676 A | * | 2/1944 | Mallard | F25C 1/24 |
| | | | | 249/77 |
| 2,628,738 A | * | 2/1953 | Hilldale | A47J 27/082 |
| | | | | 126/369 |
| 3,300,048 A | * | 1/1967 | Pollock | A47J 43/24 |
| | | | | 210/232 |
| 3,508,661 A | * | 4/1970 | Gershman | E04H 4/1272 |
| | | | | 210/167.12 |
| 5,072,849 A | * | 12/1991 | Blau | B65D 47/265 |
| | | | | 220/253 |
| 5,686,700 A | * | 11/1997 | Carpinella | A47B 21/06 |
| | | | | 174/650 |
| 5,761,987 A | * | 6/1998 | Leon | A47J 27/002 |
| | | | | 126/373.1 |
| 7,172,705 B2 | * | 2/2007 | Cooper | A47J 36/20 |
| | | | | 210/776 |
| 7,422,120 B1 | | 9/2008 | Fried | |
| 7,467,718 B1 | | 12/2008 | Donohue | |
| 7,563,365 B2 | * | 7/2009 | Pellington | E04H 4/1272 |
| | | | | 210/167.1 |
| 7,678,271 B2 | | 3/2010 | Curtin | |
| 8,347,903 B2 | | 1/2013 | De Raddo | |
| 8,961,786 B1 | * | 2/2015 | Farmer | A47J 43/24 |
| | | | | 209/258 |
| 9,107,530 B1 | * | 8/2015 | Rickabaugh | A47J 19/005 |
| 2006/0254976 A1 | * | 11/2006 | Cooper | A47J 43/285 |
| | | | | 210/470 |
| 2008/0099387 A1 | * | 5/2008 | Pellington | E04H 4/1272 |
| | | | | 210/167.1 |
| 2010/0102059 A1 | * | 4/2010 | Ruse, Jr. | B65D 43/0204 |
| | | | | 220/254.5 |
| 2010/0176157 A1 | * | 7/2010 | Long | G01F 11/46 |
| | | | | 222/189.02 |
| 2011/0226768 A1 | * | 9/2011 | Sexton | B65D 47/265 |
| | | | | 220/252 |
| 2014/0263101 A1 | * | 9/2014 | Voss Weyman | E04H 4/1272 |
| | | | | 210/776 |

* cited by examiner

COLANDER

CROSS REFERENCE TO RELATED APPLICATION

This application claims the benefit of U.S. Provisional Application No. 62/024,170 filed on Jul. 14, 2104. The above identified patent application is herein incorporated by reference in its entirety to provide continuity of disclosure.

FIELD OF THE INVENTION

The present invention generally relates to a colander. More specifically, the present invention relates to a colander including an outer shell having a screen with an open top, an upper rim, and a bottom frame with a rotatable inner screen disposed thereon. The colander further includes an annular base rotatably coupled to the bottom frame to provide an open and closed configuration for the sieve.

BACKGROUND OF THE INVENTION

Colanders are a popular kitchen utensil that allows users to drain liquid and rinse food. Some of the most common reasons for the use of colanders or strainers, are for rinsing contaminants from fruits and vegetables, and draining the cooking fluids used with pasta and other items. Typically, the conventional colanders have allowing the contents within the colander to be suspended above the basin of a sink, thereby allowing water and other fluids to be drained and disposed. The colander is also particularly beneficial for preventing contamination of the contents therein.

In addition, many individuals employ the use of colanders when rinsing and draining foodstuff. Because colanders generally have a plurality of holes throughout, food particles easily become stuck and trapped therein. This can be difficult to dislodge and can result in an unclean colander that becomes unproductive over time. People often scrape at the food particles along the sides and bottom of the colander through the use of their hands, which often leads to injuries and contamination. Therefore, it would be advantageous to have a colander that is easy to clean and provides movable parts for dislodging food particles therefrom. It would also be advantageous to have a colander that could be placed in a kitchen sink without contacting the bottom of the sink basin, and that functions properly and robustly in the kitchen sink independent of varying sink or faucet dimensions.

SUMMARY OF THE INVENTION

In view of the foregoing disadvantages inherent in the known types of colanders now present in the prior art, the present invention provides a new and improved colander wherein the same can be utilized for providing convenience for the user when draining water from food.

It is therefore an object of the present invention to provide a new and improved colander that has all of the advantages of the prior art and none of the disadvantages.

Therefore, it is an object of the present invention to provide a colander comprising an outer shell including a screen having an open top, an upper rim, and a bottom frame. The outer shell includes perforations throughout such that water or other liquids can escape therethrough. The upper rim includes at least two handles thereon.

It is yet another object of the present invention to provide a colander including a circular inner screen disposed on the bottom frame of the colander. The inner screen is rotatable via a pivot pin located at the center of the bottom frame. The circular inner screen comprises a first section and a second section that can rotate about the pivot pin.

It is another object of the present invention to provide a colander including an annular base rotatably coupled to the bottom frame to provide an open and closed configuration for the sieve. The annular base can be rotated to provide an opening in the bottom frame of the colander.

Another object of the present invention is to provide a colander that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
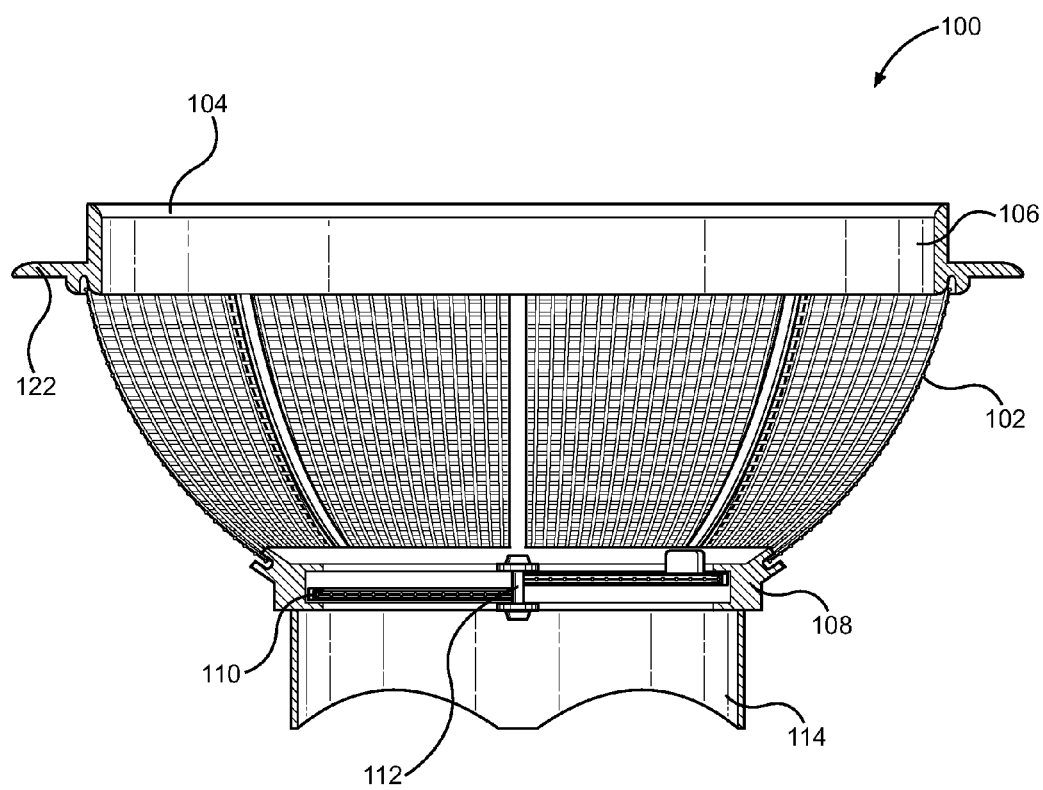
FIG. 1 shows a side cross-sectional view of the colander according to one embodiment of the present invention.

Reference is made herein to the attached drawings. Like reference numerals are used throughout the drawings to depict like or similar elements of the colander. For the purposes of presenting a brief and clear description of the present invention, the preferred embodiment will be discussed as used for draining water from food. The figures are intended for representative purposes only and should not be considered to be limiting in any respect.

Referring now to FIG. 1, there is shown a side cross-sectional view of the colander according to one embodiment of the present invention. The colander 100 includes an outer shell 102 comprising a screen having an upper rim 106 forming an open top 104, and a bottom frame 108. The outer shell 102 is substantially bowl-shaped. The outer shell 102 includes a plurality of perforations throughout so as to allow for draining water and other liquids therefrom. The outer shell 102 has a structure which allows suspending the contents therein above the basin of a sink into which the rinse water or other liquid is to be drained to facilitate disposal of the liquid and prevent contamination of the contents. The colander 100 further includes an annular base 114, which rests on the bottom of the sink basin while the contents in the outer shell 102 are suspended above.

The upper rim 106 of the outer shell 102 further comprises at least two handles 122. Each handle 122 is an L-shaped handle, wherein one portion is flush against the upper rim 106 and a second portion extends perpendicularly from the first portion. The handles 122 are removably attached to the upper arm via a fastener. The fastener is preferably a snap on connection that attaches to the upper rim 106. In a preferred embodiment, the at least two handles 122 include finger holes such that user can insert his or her fingers therethrough to grasp the handle 122.

The bottom frame 108 of the outer shell 102 includes a circular inner screen 110 disposed thereon. The inner screen 110 is rotatable via a pivot pin 112 located at a midpoint of the inner screen 110. The inner screen 110 is configured to separate wanted elements from unwanted material or for characterizing the particle size distribution of a sample, typically using a woven screen such as a mesh or net. The annular base 114 is rotatably coupled to the bottom frame 108 to provide an open and closed configuration for the inner screen 110. In this way, the inner screen 110 can be opened to allow a user to gain access to the interior volume of the colander 100.

Figure 2:
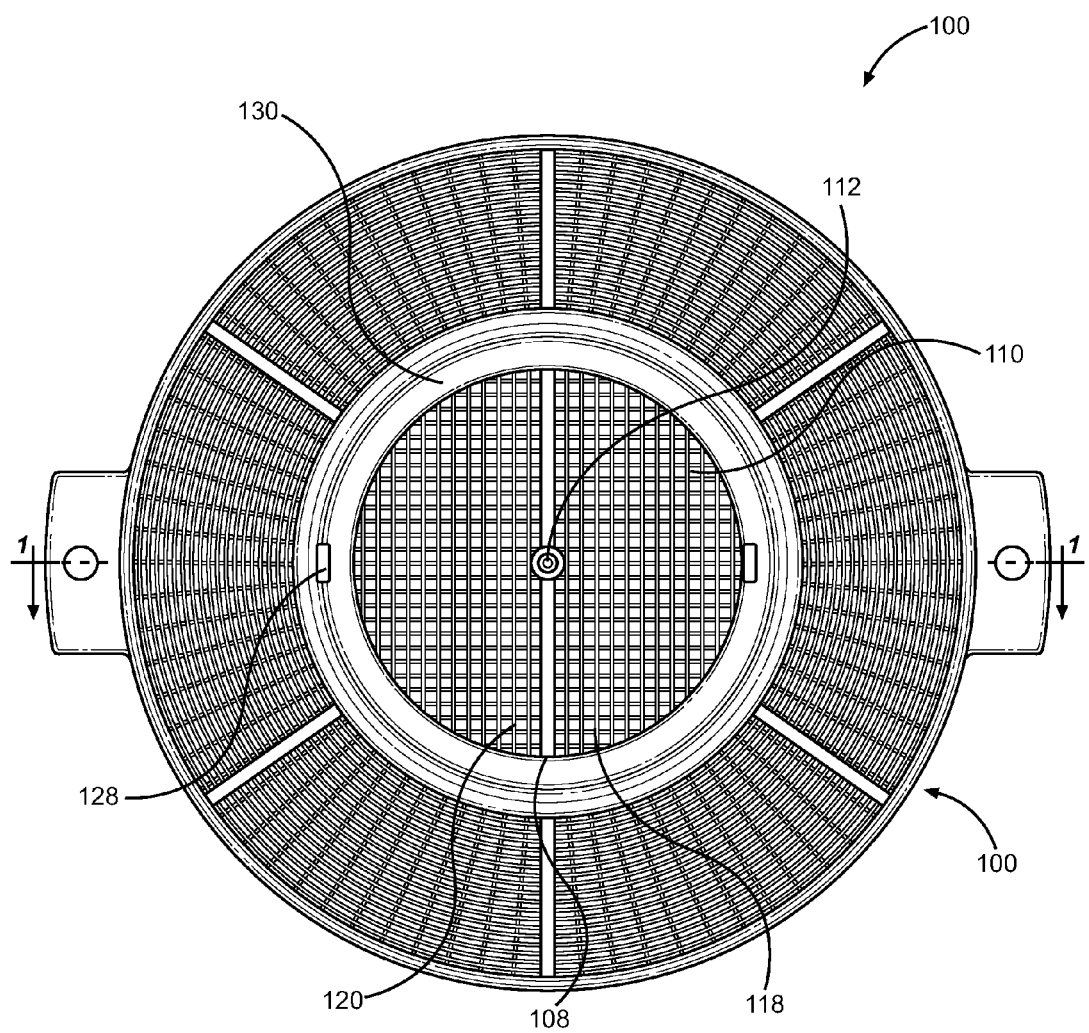
FIG. 2 shows an overhead view of the colander according to one embodiment of the present invention.
Figure 3:
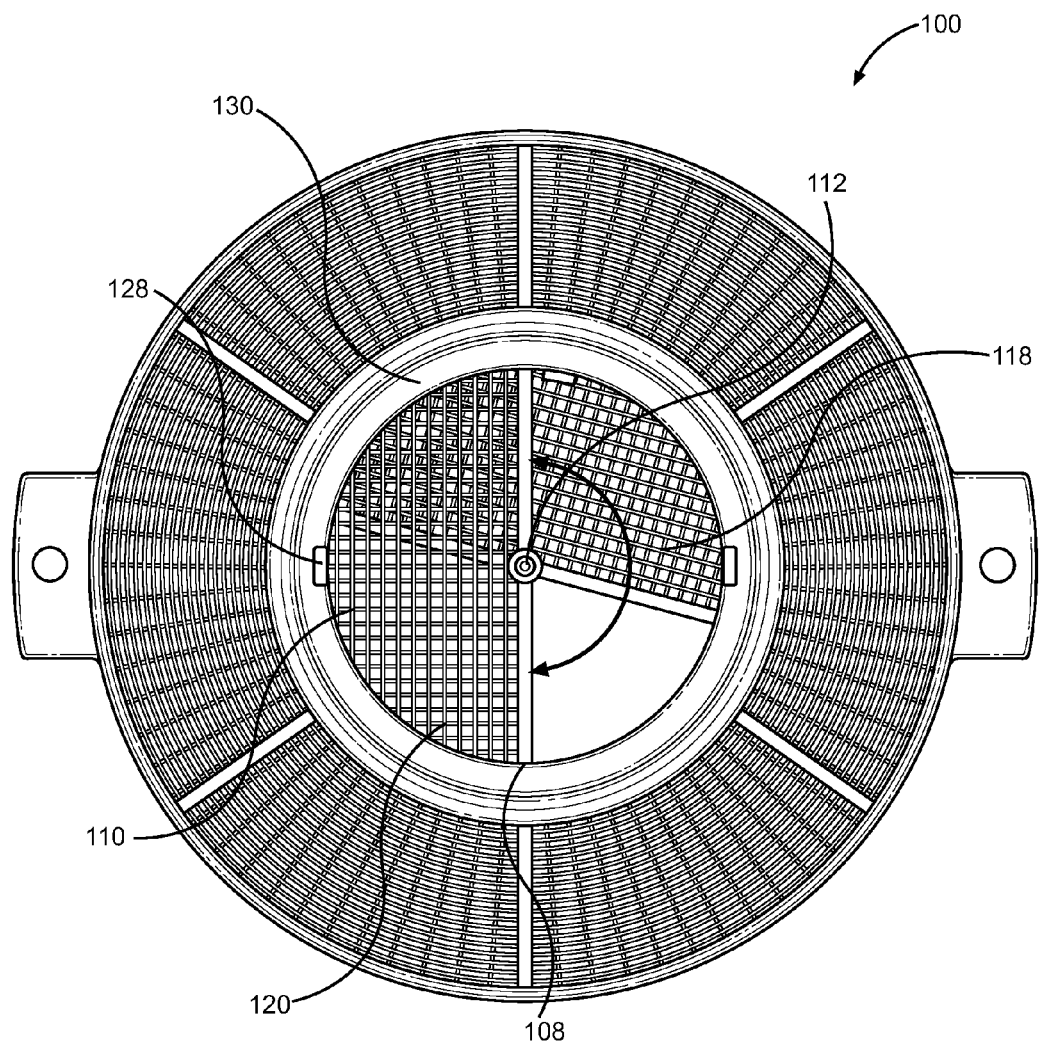
FIG. 3 shows a close-up view of the rotatable inner screen of the colander according to one embodiment of the present invention.

Referring now to FIGS. 2 and 3, there are shown views of the rotatable inner screen of the colander according to one embodiment of the present invention. The inner screen 110 includes a first section 118 and a second section 120 pivotally attached to one another via a pivot pin 112. In an open configuration, the first section 118 slides underneath the second section 120 in a stacked arrangement. In some embodiments, the circular inner screen 110 include guide rings or equivalent structure, which are supported upon rolls and enable rotation of the circular inner screen. Rotation of the circular inner screen 110 is accomplished by rotating the base 114 through the intermediary of a pivot pin 112 which is secured at the center of the inner screen 110.

The bottom frame 108 surrounds the periphery of the inner screen 110. The bottom frame 108 includes a vertical tab 128 on opposing ends on the bottom frame 108. The vertical tab 128 enables a user to selectively remove the inner screen 110 from the colander 100. The bottom frame 108 includes at least two guide rings 130 that enables rotation of the circular inner screen. The annular base is coupled to each guide ring 130 such that rotation of the base enables movement of the inner screen 110 in an open and closed configuration. The base serves as a pedestal and as a means of opening a portion of the inner screen 110 of the colander 100 when twisted or pivoted. The user can rinse food particles from the colander 100 via the opening formed when the inner screen 110 is placed in an open position.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A colander comprising:
   an outer shell comprising a screen, the screen including a bottom edge and an upper rim defining an open top, the bottom edge affixed to a bottom frame defining an opening, the bottom frame including an annular rail disposed about a perimeter of the opening;
   a circular inner screen including a first section and a second section, the first section pivotally connected to the second section via a pivot pin;
   the first section and the second section each including an arcuate edge slidably disposed along the annular rail;
   wherein the first section and second section are vertically offset; and
   an annular base rotatably coupled to the bottom frame, wherein rotation of the annular base rotates the first section relative to the second section along the annular rail to expose the opening.

2. The colander of claim 1, wherein the upper rim further comprises at least two handles.

3. The colander of claim 2, wherein the at least two handles include finger holes.

4. The colander of claim 1, wherein the circular inner screen further comprises a pair of vertical tabs configured to allow a user to selectively remove the circular inner screen.

5. The colander of claim 4, wherein each of the pair of vertical tabs is disposed on opposing ends of the circular inner screen.

6. The colander of claim 1, wherein the screen of the outer shell includes a plurality of apertures.

* * * * *